(12) United States Patent
Tsuchiya (10) Patent No.: US 8,134,635 B2
(45) Date of Patent: Mar. 13, 2012

(54) MANUAL FOCUS ADJUSTMENT ASSISTANCE APPARATUS

(75) Inventor: Hitoshi Tsuchiya, Hachioji (JP)

(73) Assignee: Olympus Corporation, Tokyo (JP)

( * ) Notice: Subject to any disclaimer, the term of this patent is extended or adjusted under 35 U.S.C. 154(b) by 597 days.

(21) Appl. No.: 12/260,563

(22) Filed: Oct. 29, 2008

(65) Prior Publication Data

US 2009/0115883 A1 May 7, 2009

(30) Foreign Application Priority Data

Nov. 2, 2007 (JP) ................................. 2007-286548

(51) Int. Cl.
*H04N 5/232* (2006.01)
(52) U.S. Cl. ...................................................... 348/345
(58) Field of Classification Search .................. 348/345, 348/346, 349, 34
See application file for complete search history.

(56) References Cited

U.S. PATENT DOCUMENTS

| 4,775,892 | A * | 10/1988 | Surdyke | 348/345 |
| 7,330,212 | B2 * | 2/2008 | Tomita | 348/345 |
| 2004/0080662 | A1 * | 4/2004 | Ogino | 348/345 |
| 2005/0057677 | A1 * | 3/2005 | Hagiwara et al. | 348/333.01 |
| 2007/0064145 | A1 * | 3/2007 | Sugimoto | 348/345 |
| 2007/0212051 | A1 * | 9/2007 | Moriya | 396/147 |
| 2009/0086036 | A1 * | 4/2009 | Safaee-Rad et al. | 348/208.6 |

FOREIGN PATENT DOCUMENTS

JP 2007-108217 A 4/2007

* cited by examiner

*Primary Examiner* — Lin Ye
*Assistant Examiner* — Amy Hsu
(74) *Attorney, Agent, or Firm* — Westerman, Hattori, Daniels & Adrian, LLP (57) ABSTRACT

An image capturing apparatus includes an optical system which forms an image of a subject. An image sensor converts the image formed by the optical system into a video signal. A focus operating unit changes the focusing status produced by the optical system according to a manual operation. An autofocus unit adjusts the focus of the optical system so as to be able to obtain the best in-focus condition according to the video signal from the image sensor. The autofocus unit is adapted to adjust the focus of the optical system within the focusing range determined according to a characteristic of the optical system after a change of the focusing status by the focus operating unit.

4 Claims, 7 Drawing Sheets

MANUAL FOCUS ADJUSTMENT ASSISTANCE APPARATUS

CROSS-REFERENCE TO RELATED APPLICATIONS

This application is based upon and claims the benefit of priority from prior Japanese Patent Application No. 2007-286548, filed Nov. 2, 2007, the entire contents of which are incorporated herein by reference.

BACKGROUND OF THE INVENTION

1. Field of the Invention

This invention relates to an image capturing apparatus having a mechanism for adjusting the focus of the optical system thereof according to the video signal from an image sensor.

2. Description of the Related Art

Many digital single-lens reflex cameras have recently been and are currently provided with an electronic viewfinder function (also referred to as a live view function). With the electronic viewfinder function, an image of the subject being shot by the camera is displayed on the display panel arranged on the rear side of the camera. In other words, the display panel operates as a viewfinder.

Since cameras having such an electronic viewfinder function can display an image of the subject being shot by the camera on the display panel, the user can make sure if the subject is there and the framing is good or not without looking at the viewfinder. Therefore, if the user wants to take an unusual shooting position such as a very elevated position or a low position close to the ground, he or she is not required to adopt a difficult posture for the camera shooting. Additionally, since the subject is displayed as an electronic image on the camera, the user can check if there is any problem such as blackout and/or whiteout in the image.

Generally, many single-lens reflex cameras can be operated in either of two focus modes including a manual focus mode where the user manually adjusts the focus and an autofocus mode where the focusing sensor mounted inside the camera detects the out-of-focus condition, if any, and automatically adjusts the focus.

Normally, the user of a single-lens reflex camera having an electronic viewfinder function more often than not selects a manual focus mode because he or she can not utilize the focusing sensor as long as the electronic viewfinder function is in operation. However, it is difficult for the user to find out a delicate out-of-focus condition, seeing the live view on the display panel. On the other hand, an image acquired by a digital camera can be enlarged and displayed with ease afterward to find out any problem in the image. Then, the user of a digital camera may be dissatisfied when he or she detects a delicate out-of-focus condition in the image after shooting.

In view of such a problem, techniques have been proposed for enlarging a part of the image on the viewfinder that the user wants to bring into a manual focus. However, such a technique is accompanied by problems including that delicate focusing is crucial and that the entire image on the viewfinder cannot be viewed at the same time. Amateur photographers may find such problems very bothersome. Even skilled photographers may not be able to successfully deal with such problems when taking handheld shots.

Jpn. Pat. Appln. Publication No. 2007-108217 proposes a digital camera having a feature of assisting the user of a camera in a manual focus mode. A digital camera proposed in Jpn. Pat. Appln. Publication No. 2007-108217 is provided with a manual focus feature of moving the focus lens according to the rotated position of a focusing ring and a focusing feature of automatically setting the focus lens at the position where the best in-focus condition can be achieved and adapted to adjust the focus so as to put the subject selected by the user not remarkably out of focus by making it possible to define the movable range of the focusing lens stepwise when adjusting the focus.

BRIEF SUMMARY OF THE INVENTION

According to an aspect of the invention, there is provide an image capturing apparatus comprising: an optical system which forms an image of a subject; an image sensor which converts the image formed by the optical system into a video signal; a focus operating unit which changes the focusing status produced by the optical system according to a manual operation; and an autofocus unit which adjusts the focus of the optical system so as to be able to obtain the best in-focus condition according to the video signal from the image sensor, wherein the autofocus unit is adapted to adjust the focus of the optical system within the focusing range determined according to a characteristic of the optical system after a change of the focusing status by the focus operating unit.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Now, an embodiment of the present invention will be described in greater detail below by referring to the accompanying drawing.

Figure 1A:
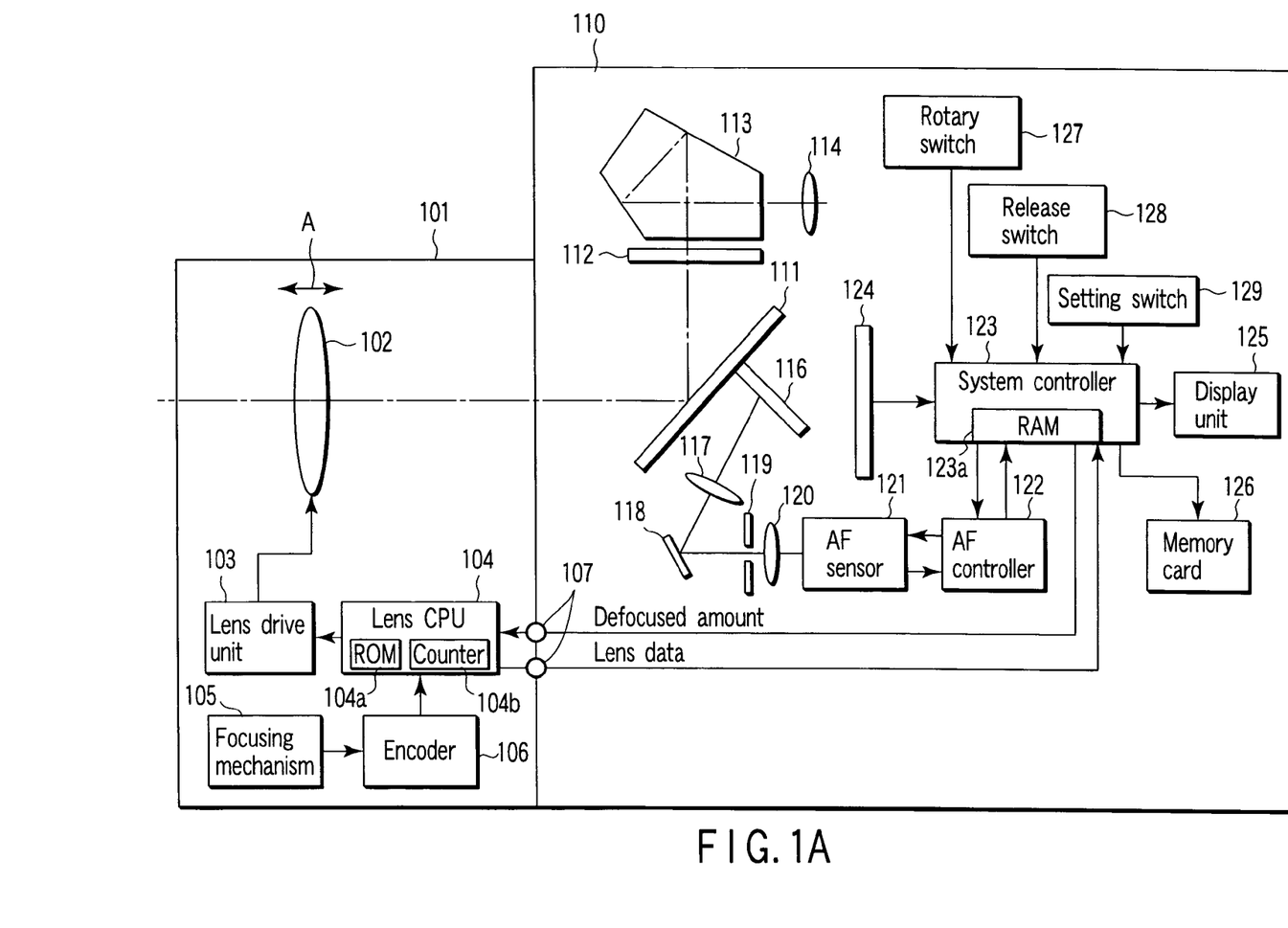
FIGS. 1A and 1B are schematic block diagrams of an image capturing apparatus according to an embodiment of the present invention, which is a digital single-lens reflex camera, showing the configuration thereof.
Figure 1B:
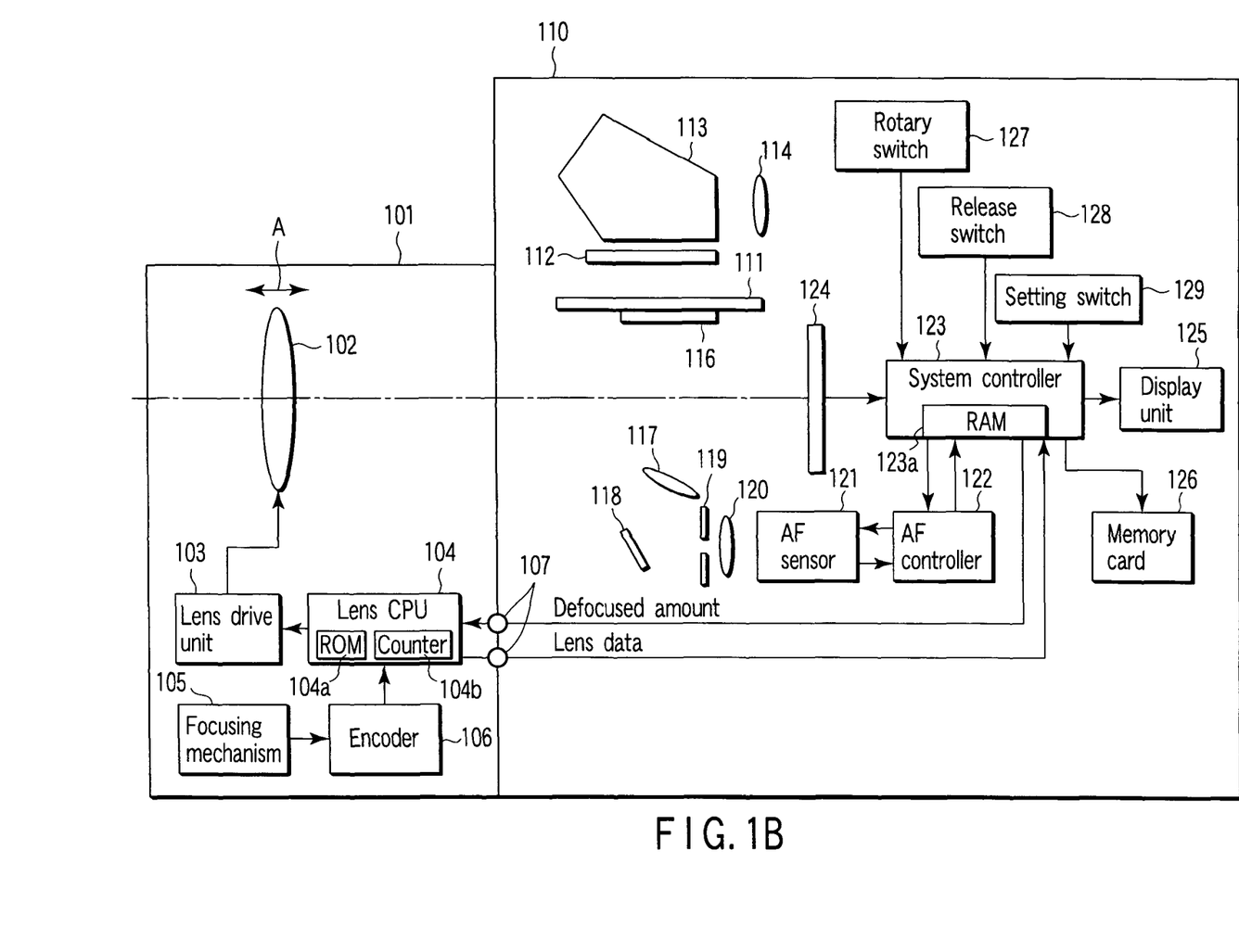

FIGS. 1A and 1B are schematic block diagrams of an image capturing apparatus according to the embodiment of the present invention, which is a digital single-lens reflex camera (and will also be referred to simply as camera from time to time), showing the configuration thereof. The camera shown in FIGS. 1A and 1B is so designed that an autofocus mode, a manual focus mode or a semi-autofocus mode can be selected for each focusing operation. The autofocus mode is a mode where all the process of adjusting the focus of the imaging optical system of the camera is executed automatically. The manual focus mode is a mode where the user manually adjusts the focus of the imaging optical system of the camera. The semi-autofocus mode is an intermediate mode between an autofocus mode and a manual focus mode. More specifically, the user manually operates for basic focusing (selection of a subject) and then the camera automatically finely adjusts the focus on the selected subject.

Now, before describing this embodiment in detail, the focusing mechanism of the camera will be described below. FIG. 1A schematically illustrates ordinary focusing by the camera, whereas FIG. 1B schematically illustrates image capturing or live-viewing by the camera.

The camera of this embodiment has an interchangeable lens 101 and a camera body 110.

The interchangeable lens 101 is detachably attached to the camera body 110 by way of a camera mount (not shown) arranged on the front side of the camera body 110. The interchangeable lens 101 includes an imaging optical system, a lens drive unit 103, a lens CPU 104, a focusing mechanism 105 and an encoder 106.

The imaging optical system includes a focus lens 102. The focusing lens 102 is a lens for adjusting the focus. The focusing lens 102 is driven along its optical axis by the lens drive unit 103 (in the direction of arrow A in FIGS. 1A and 1B) to adjust the focus position of the imaging optical system. As a result, the light flux that passes the imaging optical system from the subject (not shown) projects a focused image on the image sensor 124 in the camera body 110.

The lens drive unit 103 drives the focusing lens 102 typically by way of a DC motor according to a pulse signal supplied from the lens CPU 104.

The lens CPU 104 is a control circuit for controlling the lens drive unit 103 and other components. The lens CPU 104 can communicate with the system controller 123 in the camera body 110 by way of a communication connector 107. The lens CPU 104 transmits, to the system controller 123, the manufacturing variance data of the focusing lens and various data indicating the optical characteristics of the imaging optical system such as aberration information of the focusing lens. The manufacturing variance data of the focusing lens and various data indicating the optical characteristics of the imaging optical system are stored in a ROM 104a in the lens CPU 104 in advance.

The focusing mechanism 105 that is a focus operating unit is an operation mechanism by means of which the user directly controls the operation of driving the focusing lens 102 in the manual focus mode or in the semi-autofocus mode. The focusing mechanism 105 can give a drive direction and a drive amount either to the infinity side (the side for making the distance between the principal point of the imaging optical system including the focusing lens 102 and the imaging plane short, or the right side in FIGS. 1A and 1B) or to the closest focusing distance side (the side of making the distance between the principal point of the imaging optical system including the focusing lens 102 and the imaging plane long, or the left side in FIGS. 1A and 1B). The encoder 106 detects the drive direction and the drive amount of the focusing mechanism 105 as an electrical signal and transmits it to the lens CPU 104. The lens CPU 104 controls the lens drive unit 103 so as to drive the focusing lens 102 in the drive direction and by the drive amount according to the signal from the encoder 106. The lens CPU 104 includes a counter 104b for counting the signal from the encoder 106.

The camera body 110 includes a main mirror 111, a viewfinder optical system, an AF optical system, an AF sensor 121, an AF controller 122, a system controller 123, an image sensor 124, a display unit 125, a memory card 126, a rotary switch 127, a release switch 128 and a setting switch 129. The viewfinder optical system includes a focusing screen 112, a pentaprism 113 and an ocular lens 114. The AF optical system includes a sub mirror 116, a condenser lens 117, a total reflection mirror 118, a separator iris 119 and a separator lens 120.

The main mirror 111 is a mirror that is rotatably arranged and formed as a half mirror in a central part thereof. When the main mirror 111 is at a down position (the position shown in FIG. 1A), it partly reflects and partly transmits the light flux from the subject (not shown) that enters the camera body 110 by way of the interchangeable lens 101. The light flux reflected by the main mirror 111 is focused on the focusing screen 112. The pentaprism 113 enters the reversed image of the subject focused on the focusing screen 112 into the ocular lens 114. The ocular lens 114 enlarges the image of the subject from the pentaprism 113 to a size with which the user can conveniently observe the image. Thus, the state of the subject (not shown) can be observed in this way.

The sub mirror 116 is arranged on the rear side of the half mirror part of the main mirror 111 and reflects the light flux transmitted through the half mirror part of the main mirror 111 in the direction toward the AF optical system.

The condenser lens 117 of the AF optical system converges the light flux reflected by the sub mirror 116 and focused on a primary imaging plane (not shown) and makes it proceed in the direction toward the total reflection mirror 118. The total reflection mirror 118 reflects the light flux from the condenser lens 117 to the side of the AF sensor 121. The separator iris 119 is arranged in front of the AF sensor 121 and divides the light flux from the total reflection mirror 118. The separator lens 120 converges the light flux divided by the separator iris 119 and refocuses them on the AF sensor 121.

The AF sensor 121 converts a pair of images of the subject showing parallax formed as a result of dividing and refocusing the light flux into electric signals. Note that the AF sensor 121 is designed so as to be able to detect the focused condition in a plurality of focus area in the imaging field of view.

The AF controller 122 reads the pair of electric signals and calculates the value of the gap between the two images of the subject from the electric signals typically by a correlation operation. The system controller 123 controls the entire operation of the camera shown in FIGS. 1A and 1B. Additionally, it calculates the defocused amounts that correspond to each of the respective focus area from the value of the gap between the two images and selects the defocused amount to be used for focusing. Then, it transmits the selected defocused amount to the lens CPU 104. The lens CPU 104 adjusts the focus of the focusing lens 102 according to the defocused amount from the system controller 123.

The image sensor 124 coverts the image of the subject formed by way of the image optical system into a video signal when the main mirror 111 is retracted from the optical axis as shown in FIG. 1B. As the image of the subject is converted into a video signal by the image sensor 124, the system controller 123 executes various image processing operations on the video signal obtained by the image sensor 124. Thereafter, the system controller 123 displays the image obtained as a result of the image processing on the display unit 125 or stores the image obtained as a result of the image processing in the memory card 126.

The rotary switch 127 is a switch whose state is switched by operation of the rotary operation member externally fitted to the camera body 110 and applies the amount of operation to the system controller 123. As will be described in detail hereinafter, the rotary switch 127 is employed to adjust the focus position scanning range. The release switch 128 is a switch whose state is switched by operation of the release button externally fitted to the camera body 110 and applies a command for starting an AF operation and a command for starting image capturing to the system controller 123. The release switch 128 includes a first release switch and a second release switch. A command for starting an AF operation is issued to the system controller 123 when the release button is pressed halfway and the first release switch is turned on. A command for starting image capturing is issued to the system controller 123 when the release button is pressed all the way down, and the second release switch is turned on. The setting switch 129 is a switch whose state is switched according to the operation performed on a setting button that is externally fitted to the camera body 110. It is adapted to issue various setting commands given by the user to the system controller 123. In this embodiment, the setting switch 129 is used to select the autofocus mode, the manual focus mode or the semi-autofocus mode.

Figure 2:
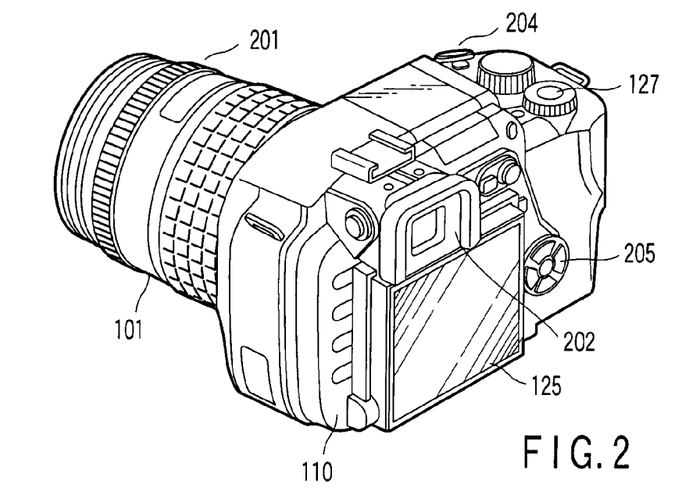
FIG. 2 is a schematic perspective view of the single-lens reflex camera of FIGS. 1A and 1B, showing the appearance thereof.

FIG. 2 is a schematic perspective view of the single-lens reflex camera of FIGS. 1A and 1B, showing the appearance thereof. Referring to FIG. 2, the focusing ring 201 that is a part of the focusing mechanism 105 provided on the interchangeable lens 101 is adapted to be rotated by the user. The direction in which and the amount by which the focusing ring 201 is rotated is detected by the encoder 106. The ocular lens 114 is arranged inside the viewfinder 202. Thus, the user can observe the subject by looking into the viewfinder 202. A rotary switch 127, a release button 204 and a setting button 205 are operation members for respectively operating the corresponding switches.

Now, the operation of the camera of this embodiment will be described below.

Firstly, the operation of the camera when the autofocus mode is selected by the setting switch 129 will be described. Note that the autofocus mode may be a single shot autofocus mode or a continuous autofocus mode. In the single shot autofocus mode, a focus area is selected from a plurality of focus areas in the display screen according to a predetermined algorithm and the focus is adjusted for the selected focus. The continuous autofocus mode is a mode suitable for a moving subject. In a continuous autofocus mode, the focus is adjusted while following the specified subject. It is assumed that the single shot autofocus mode is selected as autofocus mode in the following description.

As the release button 204 is pressed halfway and the first release switch is turned on, the system controller 123 controls the AF controller 122 so as to have it calculate the value of the gap between the two images in each focus area and then calculates the defocused amount in each focus area. Since any known technique may be used for computing the defocused amount, the process of computing the defocused area will not be described here in detail. When a plurality of defocused quantities are determined respectively for a plurality of focus areas, the system controller 123 selects a defocused amount by means of a known algorithm of weighting each of the focus areas or selecting the closest focus area and notifies the lens CPU 104 of the selected defocused amount. The lens CPU 104 controls the lens drive unit 103 according to the defocused amount it receives and drives the focusing lens 102. With such a control operation, the process of focusing on an arbitrarily selected subject is completed.

Now, the operation of the camera when the setting switch 129 is switched to the manual focus mode will be described below.

In this case, the rotation direction and rotation amount of the focusing ring 201 are detected by the encoder 106 as the user rotates the focusing ring 201. Then, a signal indicating the rotation direction and the rotation amount of the focusing ring 201 is transmitted from the encoder 106 to the lens CPU 104. The lens CPU 104 calculates the drive direction and the drive amount of the focusing lens 102 from the signal indicating the rotation direction and the rotation amount of the focusing ring 201 and drives the focusing lens 102 by controlling the lens drive unit 103 according to the results of the computations. With such a control operation, the focusing lens 102 is driven according to the operation by the user of rotating the focusing ring 201.

Figure 3:
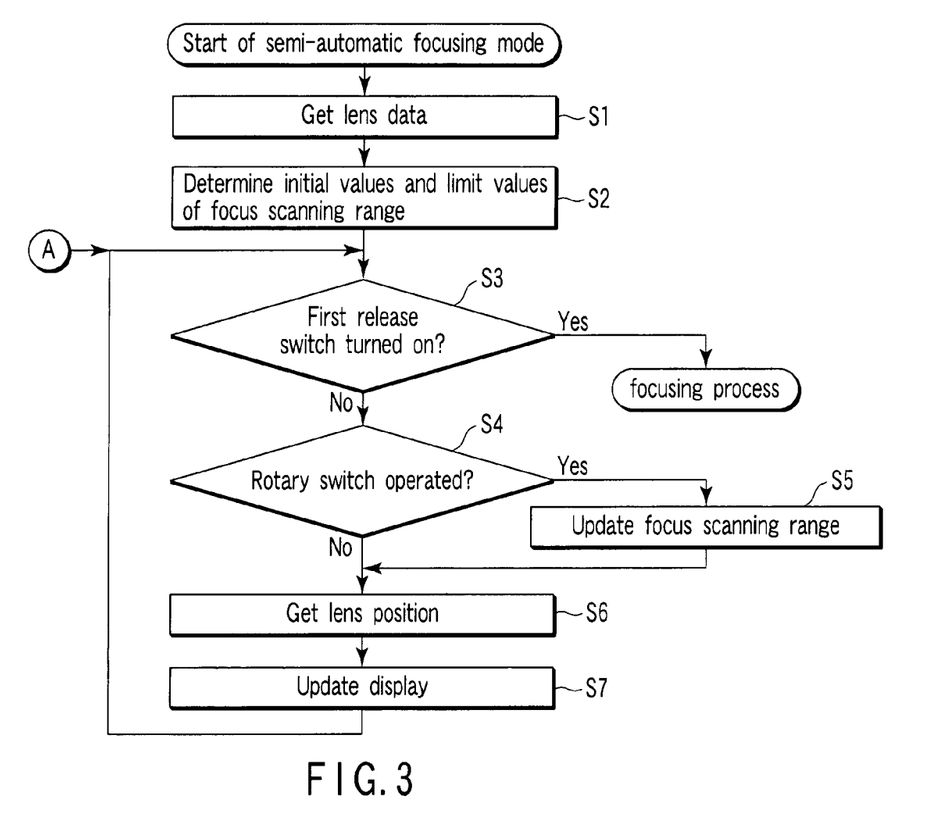
FIG. 3 is a flowchart of the main process of the system controller of the embodiment of FIGS. 1A and 1B when a semi-autofocus mode is selected.

Now, the operation of the camera when the setting switch 129 is switched to the semi-autofocus mode will be described below. FIG. 3 is a flowchart of the main process of the system controller 123 of the embodiment of FIGS. 1A and 1B when the setting switch 129 is switched to the semi-autofocus mode.

As the system controller 123 detects the start of operation in the semi-autofocus mode, it communicates with the lens CPU 104 of the interchangeable lens 101 and reads the lens data on the mounted interchangeable lens 101 (Step S1). Subsequently, the system controller 123 determines the initial values and the limit values of the focus scanning range according to the lens data it reads (Step S2).

The expression of focus scanning refers to a series of operations for detecting a peak of contrast to control the focus of the contrast system. In this embodiment, the depth of focus is typically employed as parameter for determining the focus scanning range. An appropriate multiple of the depth of focus is selected for the focus scanning range. For instance, ten times of the depth of focus, which is determined by taking the focal length of the imaging optical system and the position of the focusing lens 102 at present into consideration, is selected as the initial values of the focus scanning range or the moving range of image plane. The depth of focus refers to the range in which an image can be determined to be in focus on the focus side. On the other hand, the depth of field refers to the range in which an image can be determined in focus on the subject side according to the depth of focus.

The purpose of using such a technique of determining the focus scanning range by using the depth of focus is to control the focus scanning process in association with the out-of-focus condition, if any, of the subject.

While the initial values of the focus scanning range are determined on the basis of the depth of focus in the above-described example, the present invention is by no means limited thereto. For instance, the initial values of the focus scanning range may alternatively be determined by using some other parameter such as the aberration or the magnification of the lens.

The limit values of the focus scanning range refer to predetermined values such as the values defining the range in which the focusing lens 102 can be moved.

After determining the initial values and the limit values of the focus scanning range, the system controller 123 determines if the release button 204 is pressed halfway and the first release switch is turned on or not (Step S3). If it is determined in Step S3 that the first release switch is turned on, the system controller 123 executes a focusing process, which will be described in greater detail hereinafter.

Figure 4:
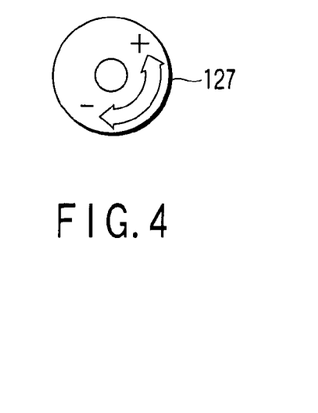
FIG. 4 is a schematic top view of a rotary switch.

If, on the other hand, it is determined in Step S3 that the first release switch is not turned on, the system controller 123 determines if the rotary switch 127 is operated by user or not (Step S4). If it is determined in Step S4 that the rotary switch 127 is operated, the system controller 123 updates the focus scanning range according to the direction of the operation (Step S5). FIG. 4 is a schematic top view of a rotary switch 127. As shown in FIG. 4, the rotary switch 127 is designed to be rotated to the + side (counterclockwise) or to the − side (clockwise).

The system controller 123 extends the focus scanning range when the rotary switch 127 is rotated to the + side, whereas it contracts the focus scanning range when the rotary switch 127 is rotated to the − side. Note that the focus scanning range is expanded by increasing the value of the multiplying factor by which the depth of focus is multiplied, whereas the focus scanning range is contracted by decreasing the value of the multiplying factor by which the depth of focus is multiplied.

The focus scanning range is not updated if the focus scanning range exceeds any of the limit values determined in Step S2 or goes below the minimum range of focus scanning. The operability is adversely affected when the focus scanning range is contracted too much. Therefore, the lower limit value of the focus scanning range may be defined in advance according to the optical characteristics of the imaging optical system.

Figure 5:
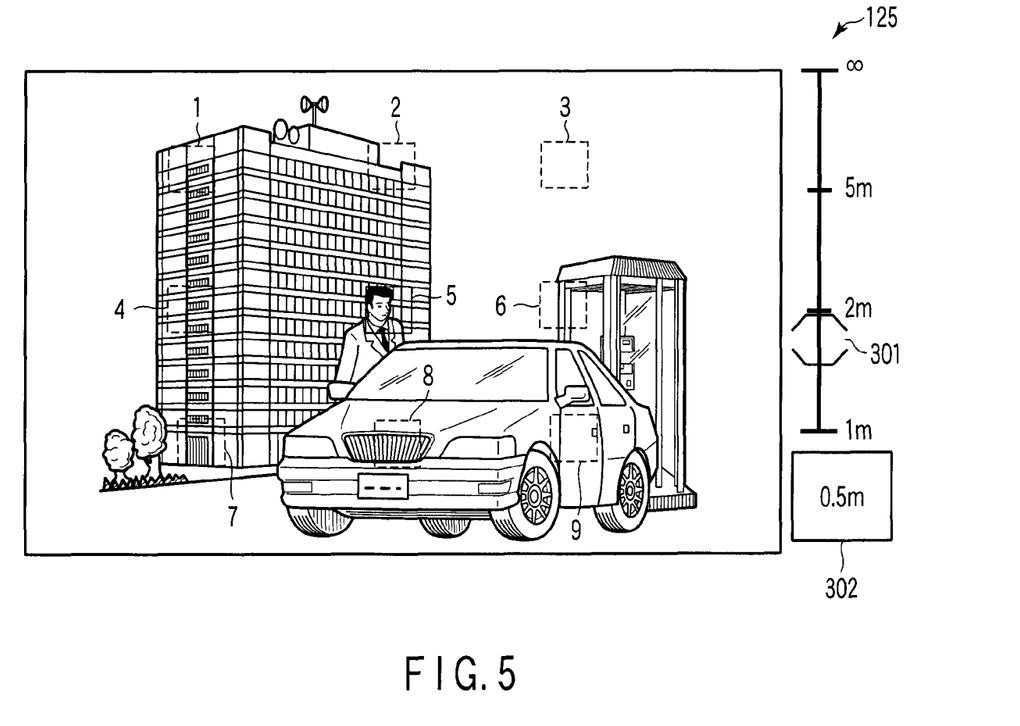
FIG. 5 is a schematic illustration of an exemplary view displayed on the viewfinder of the camera of FIGS. 1A and 1B, illustrating the position of the focusing lens and the focus scanning range.

When it is determined in Step S4 that the rotary switch 127 is not operated, the system controller 123 communicates with the lens CPU 104 and acquires the lens position of the focusing lens 102 (Step S6). Thereafter, the system controller 123 has the display unit 125 display the position of the focusing lens 102 and the focus scanning range in the selected semi-autofocus mode (Step S7). FIG. 5 is a schematic illustration of an exemplary view displayed on the viewfinder of the camera of this embodiment, illustrating the position of the focusing lens and the focus scanning range. In the instance of FIG. 5, a plurality of focus areas (nine including 1 through 9 in FIG. 5) is defined in the field of view and the defined focus areas are displayed so that the user can visually recognize them. Additionally, an indicator 301 is displayed to show the current position of the focusing lens as determined by referring to the imaging plane and the focus scanning range that is centered at this current position. Furthermore, a display 302 shows the actual value of the focus scanning range. The indicator 301 shows the focus scanning range as converted to the range on the subject side. While the coefficient of this conversion can be determined from the focusing length and the lens position, it will not be described here any further.

As described above, in the semi-autofocus mode, the focusing lens 102 is driven according to user's operation of the focusing ring 201 as in the manual focus mode until the first release switch is turned on. Then, the focusing lens 102 can be constantly moving according to the user's operation. Therefore, the system controller 123 constantly monitors the position of the focusing lens 102 to detect if the user is operating the focusing ring 201 or not. Additionally, the system controller 123 has the indicator display 301 displayed as shown in FIG. 4 according to the detected lens position and notifies the user of the position of the focusing lens 102 and the focus scanning range.

Figure 6:
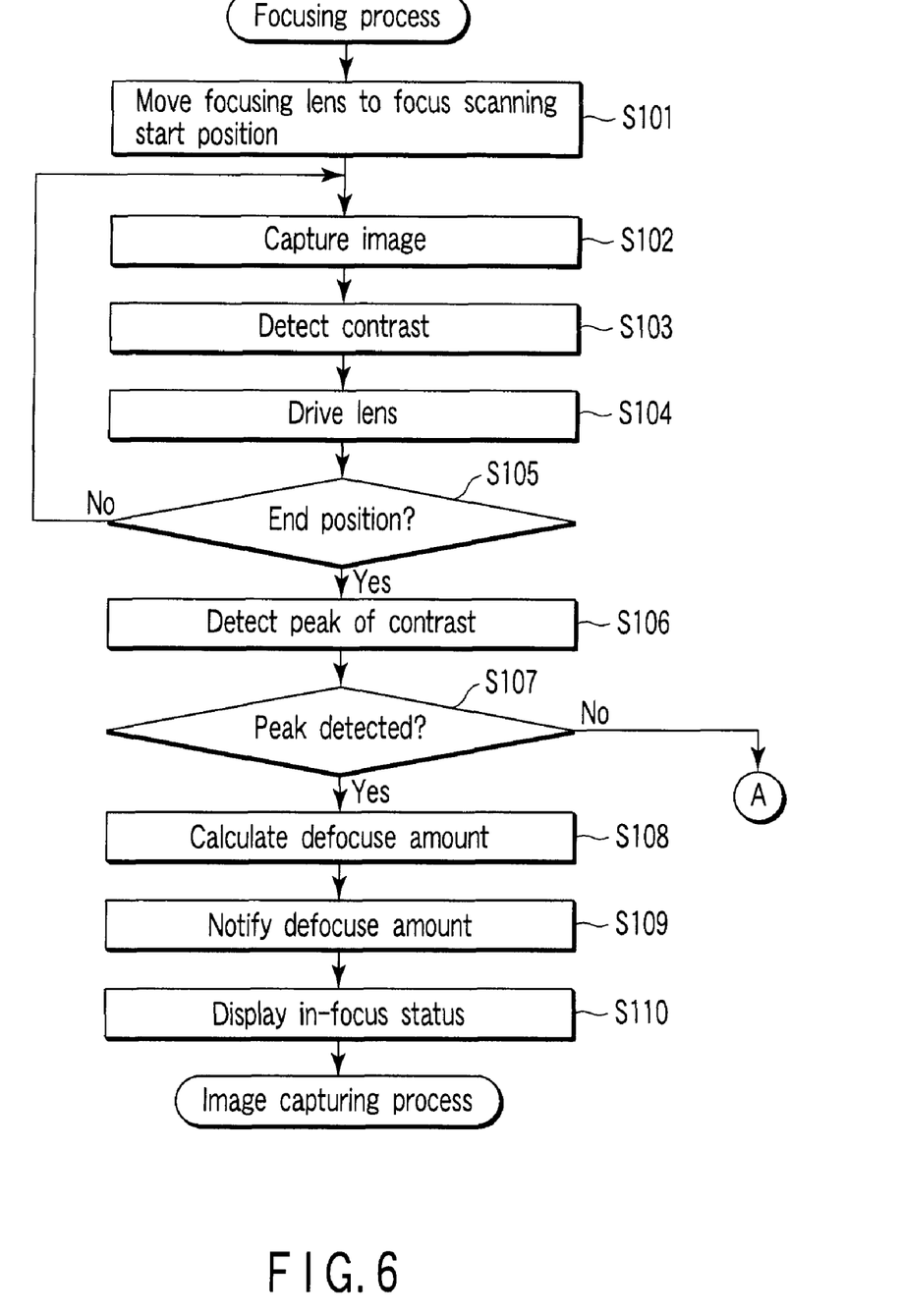
FIG. 6 is a flowchart of the focusing process of the camera of FIGS. 1A and 1B.

Now, the focusing process of this embodiment will be described below by referring to FIG. 6. In the focusing process, the system controller 123 sends a command to the lens CPU 104 so as to move the focusing lens 102 to the focus scanning start position (Step S101). The focus scanning start position is determined in a manner as described below.

Firstly, the position of the focusing lens 102 at the time when the first release switch is turned on is selected as the center of the focus scanning range. Since the focus scanning range is determined in Step S2, the focus scanning start position is the position separated from the center position by the distance equal to ½ of the focus scanning range in the direction of driving the focusing lens 102. Thus, if the focusing lens 102 is driven in the direction toward infinity, the focus scanning start position is the position separated from the center position by the distance equal to ½ of focus scanning range in the direction toward the closest end, or the position of the closest end. Conversely, if the focusing lens 102 is driven in the direction toward the closest end, the focus scanning start position is the position of the infinity end of the focus scanning range.

After moving the focusing lens 102 to the focus scanning start position, the system controller 123 starts a focus scanning operation. Firstly, the system controller 123 drives the image sensor 124 to take in the video signal (Step S102). Then, the system controller 123 detects the contrasts of the focus areas and holds the contrasts corresponding to positions of the focusing lens in the RAM 123a (Step S103) from the video signal it reads. Subsequently, the system controller 123 issues a command to the lens CPU 104 so as to drive the focusing lens 102 by a predetermined amount (Step S104). After driving the lens, the system controller 123 determines if the focusing lens 102 gets to the focus scanning end position or not (Step S105). If the focusing lens 102 is driven toward infinity, the focus scanning end position is the infinity end of the focus scanning range. If, on the other hand, the focusing lens 102 is driven toward the closest end, the focus scanning end position is the closest end of the focus scanning range. If it is determined in Step S105 that the focusing lens 102 does not get to the focus scanning end position yet, the process returns to Step S102.

If, on the other hand, it is determined in Step S105 that the focusing lens 102 already gets to the focus scanning end position, the system controller 123 detects a peak of the contrast that corresponds to each position of the focusing lens held in the RAM 123a (Step S106). Then, the system controller 123 proceeds to Step S106, where it determines if a peak of the contrast can be detected or not (Step S107). If it is determined in Step S107 that the peak cannot be detected, the system controller 123 goes out of the focusing process and executes the process from Step S3 on in FIG. 3.

If, on the other hand, it is determined in Step S107 that the peak can be detected, the system controller 123 calculates the defocused amount between the current position of the focusing lens 102 and the position of the focusing lens 102 that corresponds to the peak (Step S108). Thereafter, the system controller 123 notifies the lens CPU 104 of the defocused amount (Step S109). Then, the lens CPU 104 drives the focusing lens 102 according to the defocused amount it receives.

After the focusing lens 102 stops at the in-focus position, the system controller 123 display the in-focus status on the display unit 125 (Step S110). Subsequently, the system controller 123 executes the image capturing process, which will be described in detail hereinafter.

An in-focus status is obtained in the focus area 5 in the instance illustrated in FIG. 5. Then, the focus area 5 is highlighted and thus, the user can easily find out which subject is currently in-focus.

Figure 7:
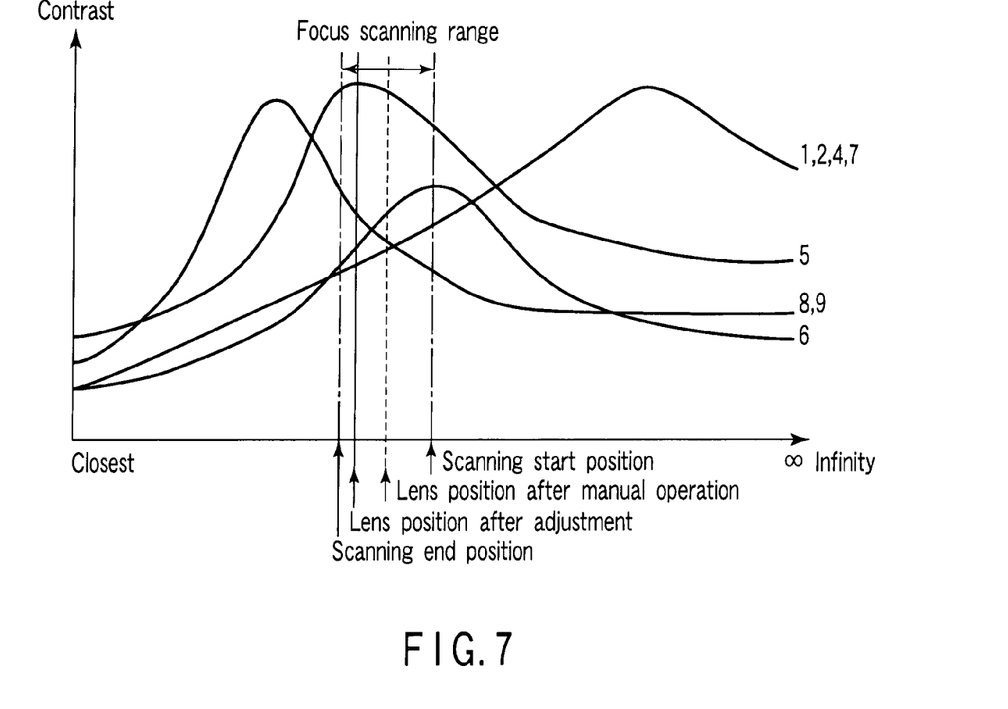
FIG. 7 is a graph illustrating the relationship between the contrast of the subject of camera shooting and the lens position for the field of view shown in FIG. 5.

FIG. 7 is a graph illustrating the relationship between the contrast of the subject of camera shooting and the lens position for the field of view shown in FIG. 5. It is assumed in FIG.

7 that a peak of the contrast is detected in the focus area 5 shown in FIG. 5 and the focus area 5 is in focus. The flow of operation until putting a subject in focus will be described below by referring to the corresponding user operation. Firstly, the subject in the focus area 5 is put in focus of the focusing lens 102 by manual focus. Note that the position of the focusing lens 102 stopped at by the manual focus is "the lens position after the manual operation" in FIG. 7. A focus scanning range is determined so as to be centered at this position. After determining the focus scanning range, the focusing lens 102 is moved to the focus scanning start position and focus scanning or contrast detection is started from this position.

It is determined if a peak of contrast is detected or not when the focusing lens 102 gets to the focus scanning end position. If the peak is detected, the focusing lens 102 is moved to the lens position that corresponds to the detected peak ("the lens position after adjustment" in FIG. 7). In the instance of FIG. 7, the peak of contract is detected only in the focus area 5 within the focus scanning range. Therefore, the focus is adjusted for the focus area 5 and after the focusing, that the focus area 5 is put in focus is displayed. When a plurality of peaks that correspond to a plurality of in-focus detection areas is detected within the focus scanning range, the focus area for which the focus is adjusted is selected according to the priority that is predefined for the focus areas. Techniques for defining the priority that can be used for the purpose of the present invention includes a technique of giving higher priority to a position closer to the center of the field of view for imaging and a technique of giving higher priority to a position closer to the lens position after manual focus.

Figure 8:
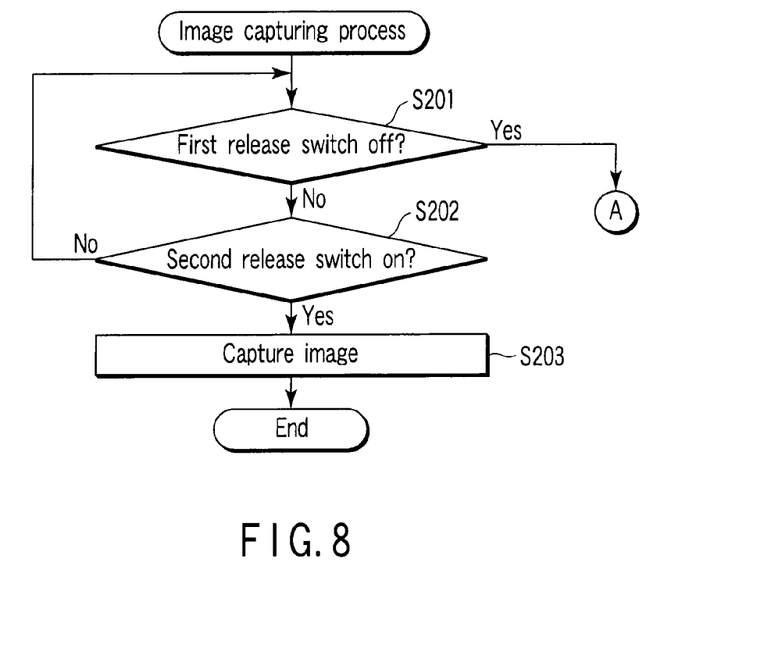
FIG. 8 is a flowchart of the shooting process of the camera of FIGS. 1A and 1B.

Now, the image capturing process of this embodiment will be described below by referring to FIG. 8. In the image capturing process, the system controller 123 determines if the first release switch is turned off or not (Step S201). If it is determined in Step S201 that the first release switch is turned off, the system controller 123 goes out of the image capturing process and executes the process from Step S3 on in FIG. 3. If, on the other hand, it is determined in Step S201 that the first release switch is held on, the system controller 123 determines if the release button 204 is fully pressed and the second release switch is turned on or not (Step S202). If it is determined in Step S202 that the second release switch is not turned on, the process returns to Step S201, where the system controller 123 stands by until the first release switch is turned off or the second release switch is turned on. If, on the other hand, it is determined in Step S202 that the second release switch is turned on, the system controller 123 executes image capturing (Step S203). This image capturing is an operation where the system controller 123 controls the operation of the image sensor 124 and reads the video signal from the image sensor 124. Then, the system controller 123 executes various image processes on the video signal it reads and subsequently records the processed video signal on the memory card 126.

Figure 9:
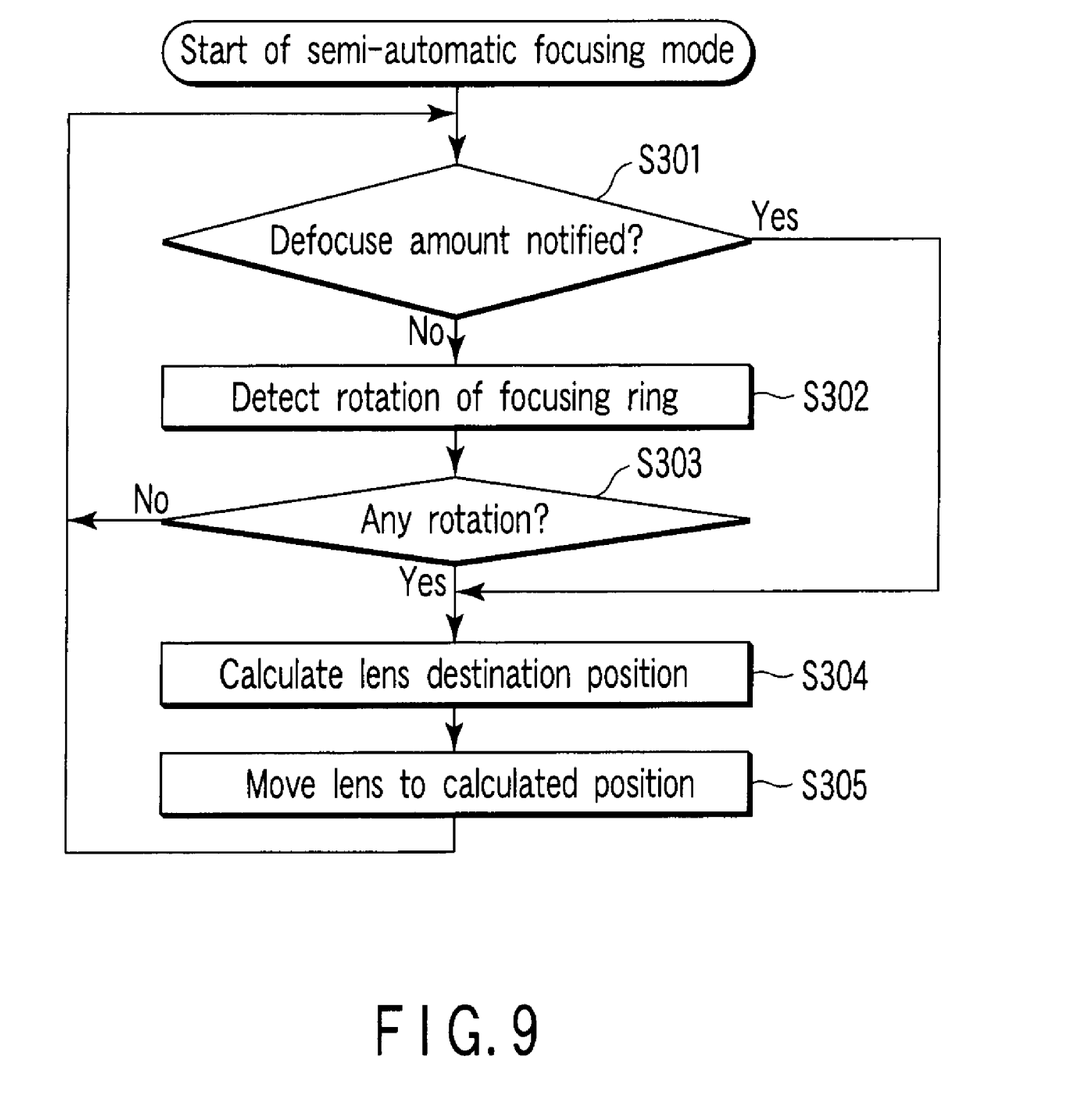
FIG. 9 is a flowchart of the process that a lens CPU executes in a semi-autofocus mode.

Now, the process that the lens CPU 104 executes in the semi-autofocus mode will be described below by referring to the flowchart of FIG. 9. Note that, only the process relating to semi-autofocus will be described by referring to FIG. 9. Actually, while the process relating to the semi-autofocus is executed, other processes are executed in parallel with the process of FIG. 9. Such other processes typically include a process of notifying the system controller 123 of the position of the focusing lens 102 when the system controller 123 asks the position of the focusing lens 102.

In the semi-autofocus mode, firstly the lens CPU 104 determines if it is notified of the defocused amount by the system controller 123 or not (Step S301). If it is determined in Step S301 that the lens CPU 104 is not notified of the defocused amount, the lens CPU 104 detects, if any, the operation of rotating the focusing ring 201 (Step S302). The operation of rotating the focusing ring 201, which is part of the focusing mechanism 105, is transmitted to the encoder 106 by way of the focusing mechanism 105. The encoder 106 converts the amount by which the focusing ring 201 is rotated, or the rotation amount of the focusing ring 201, into an electrical signal and outputs the electrical signal to the lens CPU 104. The lens CPU 104 detects the rotation amount and the rotation direction of the focusing ring 201 by counting the signals from the encoder 106 by means of the counter 104b. The rotation amount can be determined from the absolute value of the difference between the last reading of the counter showing the number of signals from the encoder 106 and the current reading of the counter. The rotation direction can be determined from the sign of the difference of the readings.

Then, the lens CPU 104 determines in Step S302 if an operation of rotating the focusing ring 201 can be detected and hence any difference of readings can be detected or not (Step S303). If it is determined in Step S302 that no operation of rotating the focusing ring 201 can be detected, the process returns to Step S301. If, on the other hand, it is determined in Step S303 that an operation of rotating the focusing ring 201 can be detected, the lens CPU 104 calculates the position of the destination for driving the focusing lens 102 according to the amount and direction of rotation detected in Step S302 (Step S304). Subsequently, the lens CPU 104 controls the lens drive unit 103 so as to drive the focusing lens 102 to move to the position of the destination (Step S305).

If, on the other hand, it is determined in Step S301 that the lens CPU 104 is notified of the defocused amount, the lens CPU 104 calculates the position of the destination for driving the focusing lens 102 according to the defocused amount. Subsequently, the lens CPU 104 controls the lens drive unit 103 so as to drive the focusing lens 102 to move to the position of the destination.

As described above, with this embodiment, the user is only required to put the subject in focus as in the case of manual focus. Then, the embodiment automatically and reliably puts the subject accurately in focus. Thus, this embodiment can easily and reliably put the subject in focus. Additionally, focusing can be realized with an optimum operability each time the interchangeable lens is replaced by determining the initial values of the focus scanning range according to the optical characteristics of each of the interchangeable lenses 101 that the embodiment is equipped with. Still additionally, the user can execute focusing at any desired timing by pressing the release button 204 halfway for autofocus. This arrangement is effective when the framing of a scene is decided and the camera waits for the subject coming into the scene.

Additionally, since the user can alter the focus scanning range by operating the rotary switch 127, the focus scanning range can be defined according to the scene to be shot by the user. For example, a narrow focus scanning range may be selected when fine focusing is required as in the case of performing macrophotography, whereas a broad focus scanning range may be selected for zooming in operation.

The user can imagine with ease the range of focusing for the subject when the focus scanning range is expressed by distances on the subject side and displayed on the display unit 125.

While the image capturing apparatus of the above-described embodiment is a single-lens reflex camera having an interchangeable lens, an image capturing apparatus according to the present invention is by no means required to be a camera having an interchangeable lens. Additionally, while the AF controller 122 and the system controller 123 are provided as separate units in the above-described embodiment, they may be integrally combined with each other. Still additionally, while the autofocus mode is selected when the release button 204 is pressed halfway in the above-described embodiment, it may alternatively be so arranged that the autofocus mode is selected only when the focusing ring 201 is stopped and the stopped status is detected.

Additionally advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image capturing apparatus for assisting manual focusing operation, the apparatus comprising:
   an interchangeable optical system which forms an image of a subject:
   an image sensor which converts the image formed by the interchangeable optical system into a video signal;
   a focus operating unit which drives the interchangeable optical system according to a manual operation;
   an autofocus unit which adjusts a position of the interchangeable optical system so as to obtain the best in-focus condition based on the video signal from the image sensor; and
   a focus range determining unit which derives a depth of field from the interchangeable optical system and determines an auto focusing range of the auto focus unit based on the depth of field,
   wherein the autofocus unit is adapted to adjust the position of the interchangeable optical system within the auto focusing range determined by the focus range determining unit so as to have the position of the interchangeable optical system after the focus operating unit drives the interchangeable optical system as a center.

2. The apparatus according to claim 1, further comprising:
   a range defining unit equipped with a manual operating member, which defines the auto focusing range based on setting of the manual operating member.

3. The apparatus according to claim 1, further comprising:
   a display unit which expresses the focusing range by distances on the subject side and displays the expressed focusing range.

4. The apparatus according to claim 1, further comprising:
   a release button adapted to issue a command for adjusting the focus to the autofocus unit when pressed halfway after the operation of the focusing unit and issue a command for starting an image capturing operation when pressed fully.

* * * * *